July 19, 1966   H. POTTASH   3,261,201
GASOLINE LEAK DETECTOR

Filed Dec. 3, 1964   2 Sheets-Sheet 1

INVENTOR.
HERBERT POTTASH
BY *Karl L. Spivak*

ATTORNEY

July 19, 1966  H. POTTASH  3,261,201

GASOLINE LEAK DETECTOR

Filed Dec. 3, 1964  2 Sheets-Sheet 2

INVENTOR.
HERBERT POTTASH

BY Karl L. Spivak

ATTORNEY

United States Patent Office 3,261,201
Patented July 19, 1966

3,261,201
GASOLINE LEAK DETECTOR
Herbert Pottash, 1000 S. 50th St., Philadelphia, Pa.
Filed Dec. 3, 1964, Ser. No. 415,747
1 Claim. (Cl. 73—40.5)

This invention relates generally to the field of dispensing gasoline and more particularly to the retail type of business wherein gasoline service stations may be located in or near heavily populated or built up areas.

Most service stations presently in use utilize gasoline dispensing units having individual, integral pumps to draw gasoline from underground storage tanks and deliver the product under pressure to the familiar dispensing nozzle. In such an arrangement, should a leak occur in the piping system anywhere between the pump and the tank, air would be drawn into the pipe under the influence of the pump suction thereby causing loss of prime. Under such conditions, upon occurrence of a leak anywhere in the suction piping system, the presence of the leak is readily detected simply from the fact that gasoline can no longer be delivered by the pump due to the loss of prime. Should a leak occur, the service station would be out of business due to its inability to deliver product.

A relatively new pumping arrangement, however, has now rendered this basic method of leakage detection obsolete and new procedures are required. In the interest of greater efficiency in operation, many petroleum companies have changed from the older integral pump arrangement and now design and specify service station equipment utilizing submersible pumps. That is, a type of pump engineered for remote installation directly at the individual tank itself. In such a system, the pump and motor assembly is installed completely immersed within the tank with the pump impeller extending downward to within approximately three inches of the bottom of the tank. The upper end of the pump assembly comprising electrical connections, check valve, relief valve and pump discharge is connected directly above the tank by a threaded connection into a standard four inch tank opening.

The increasing use of the remote, submersible pump has resulted in a unique problem in determining pipe leakage. Due to the fact that the pump is installed directly within the gasoline tank, suction piping is no longer required. Rather, all of the piping from the pump to the dispensing unit is discharge piping designed to operate under pump pressure to carry product from the tank to the dispenser. Should a leak occur in this discharge piping, it will have no effect whatsoever on the pump prime and so the usual method of leakage detection has been rendered entirely obsolete. As can be readily seen, this new method of installation makes underground piping leaks even more dangerous as the entire piping system when in operation is under pressure. Thus a relatively small leak can cause large loss of product in a short period of time. In urban communities, where residences and commercial buildings often adjoin gasoline service stations, undetected underground product leakage can cause a serious risk to both life and property.

At present, the only way that a service station operator can detect underground leakage in remote pump installations is either by actually seeing or smelling the leak or by the method of product control. That is, by keeping accurate inventory records of the exact amount of gasoline delivered by tank truck and the exact amount sold as indicated by the individual meters at the dispensing units. Any discrepancy in the volume sold and the volume delivered could be attributed to underground tank or pipe leakage. The instant invention is directed to simply and efficiently furnishing a method and device for determining when underground remote pump discharge piping develops leaks.

It is therefore an object of this invention to provide a gasoline leakage detector designed for use with remote submersible pump type installations.

It is another object of this invention to provide a gasoline leakage detector compatible for use with existing remote pump installations.

It is another object of this invention to provide a gasoline leakage detector designed to monitor the discharge piping of a remote pump installation at all times, where the station be open or closed.

It is another object of this invention to provide a gasoline leakage detector for remote pump installations designed to give visual signals indicating faults in the piping system.

It is another object of this invention to provide a gasoline leakage detector that is inexpensive in manufacture, uncomplicated in installation and trouble free in operation.

Other objects and a fuller understanding of the invention will be had by referring to the following description and claims of a preferred embodiment thereof, taken in conjunction with the accompanying drawing wherein like reference characters refer to similar parts throughout the several views and in which:

Figure 1:
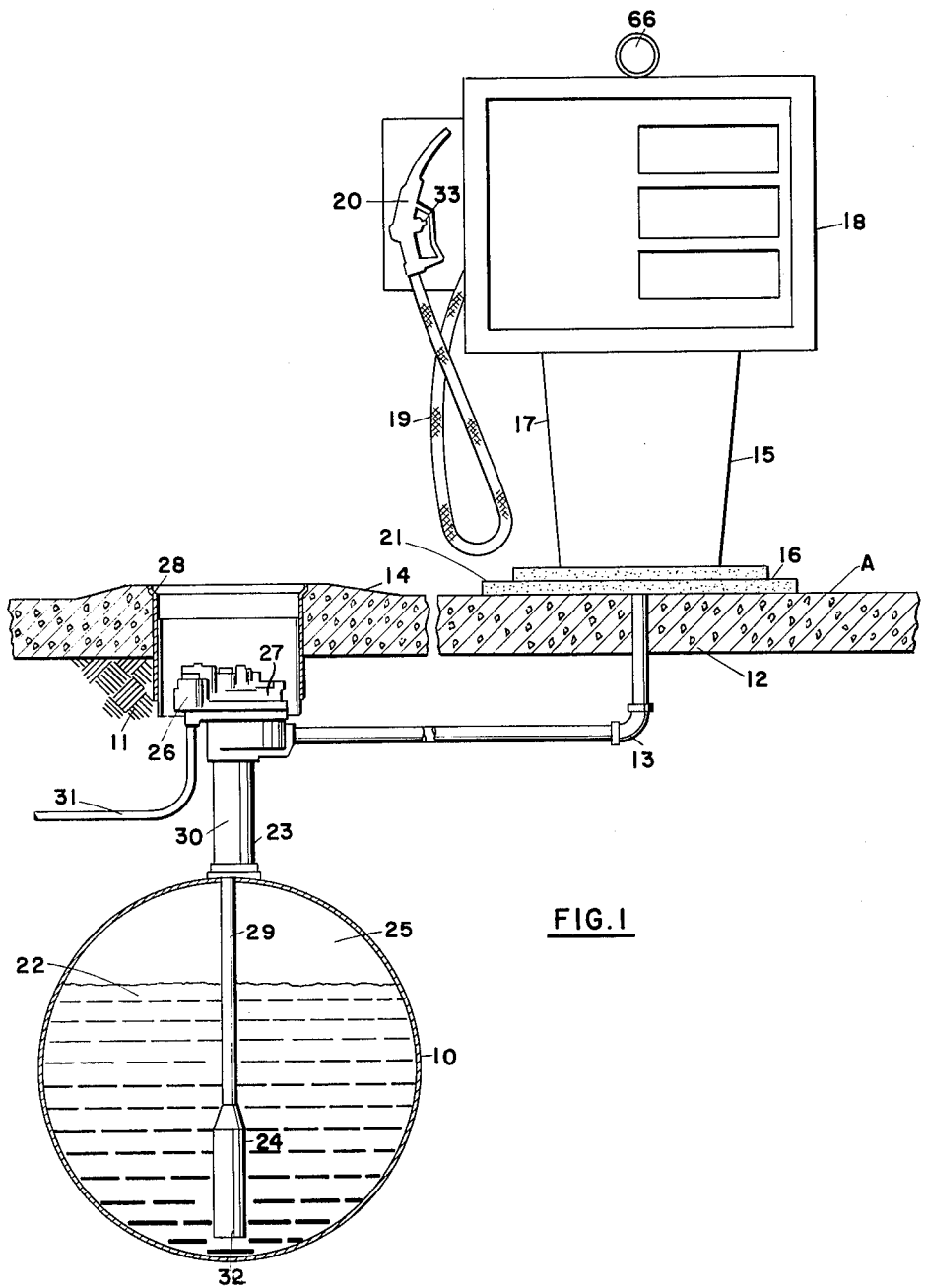
FIG. 1 is an elevational view, partly in cross section showing the piping arrangement wherein the instant invention finds utility.

Although specific terms are used in the following description for the sake of clarity, these terms are intended to refer only to the particular structure of my invention selected for illustration in the drawings and are not intended to define or limit the scope of the invention.

In FIG. 1, I show a diagrammatical elevational view, partly in cross section of a remote pumping type of service station generally designated A. A gasoline tank 10 or plurality of tanks of conventional design are installed as underground tanks with earth cover 11 approximately two feet to three feet in thickness. A pad 12 of concrete or asphaltic concrete is usually provided over the entire projected area of tanks 10 and piping 13 to protect the underground structures from strain or damage caused by the weight of motor vehicles (not shown) driving upon the surface 14 of service station A.

As shown, a dispensing unit 15 comprising the usual base 16 supporting pedestal 17 and meter enclosure 18 rests upon pump island 21. Nozzle 20 and hose 19 deliver gasoline 22 from tank 10 and piping 13 to the motor vehicle fuel tank (not shown). Submersible pump unit 23 is installed with pump and motor assembly 24 immersed in the gasoline 22 in tank interior 25 while electrical junction box 26 and check valve 27 are arranged within manhole 28 and physically connected with pump assembly 24 by means of galvanized pipe 29 and extractor nipple 30. Conduit 31 contains current carrying conductors supplying required electrical power for pump operation and is attached to junction box 26 in any usual, approved manner. Pump assembly 24 urges gasoline 22 from tank 10 through suction inlet 32, pipe 29, nipple 30 and piping 13 and delivers the product to hose 19 and nozzle 20 under pressure sufficient to assure adequate flow through the nozzle.

It can thus be demonstrated that when the system is in proper functioning condition, the pump and motor assembly 24 operates to fill the entire piping system 13 with gasoline at operating pressure. Due to the action of check valve 27, gasoline is permitted to flow from tank 10 to nozzle 20, but reverse flow is effectively prevented. Gasoline under pressure then, is maintained within pipes 13 at all times, whether or not gasoline is actually being pumped. If desired, the pump controls may be so set as to automatically maintain any desired pressure so as to assure instantaneous flow when the nozzle trigger 33 is pressed.

Figure 2:
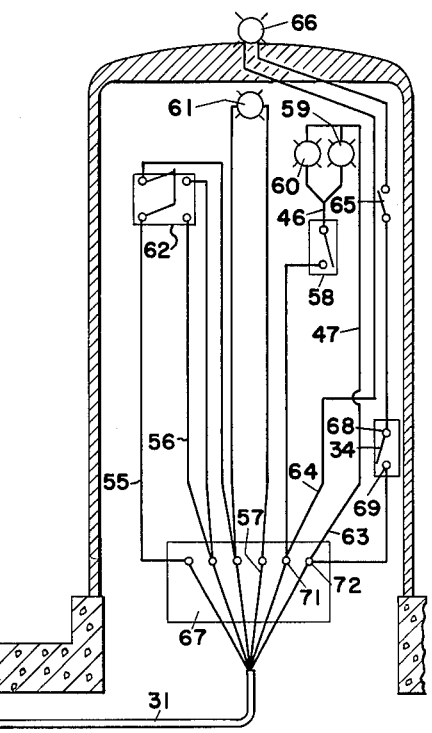
FIG. 2 is an elevational view of a dispensing unit partially broken away showing arrangement of the instant invention.
Figure 2:
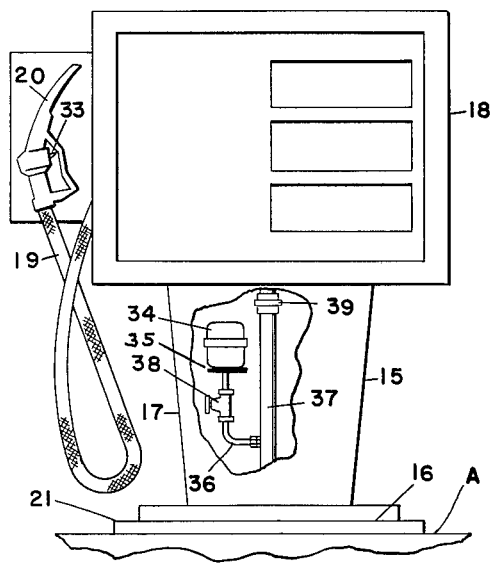
Figure 3:
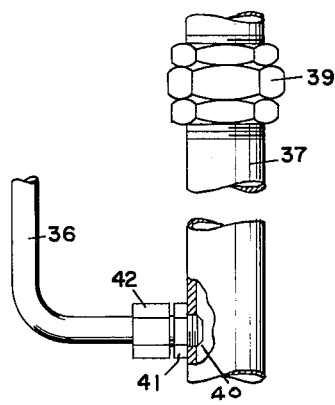
FIG. 3 is a detail view showing piping connection of the invention.

By utilizing the principle of positive pressure maintained in the piping system, I can then construct a gasoline leakage detector compatible for use with existing remote pump installations as well as with entirely new service stations. As seen in FIG. 2, I mount a pressure switch 34 upon a steel shelf 35 within the dispensing unit 15 and connect a length of tubing 36 to gasoline piping riser 37 below union 39 with flow to pressure switch 34 controlled by gate valve 38. In order to install pressure switch 34, riser 37 is first provided with a drilled and tapped opening 40 and a fitting 41 is threadedly tightened therein. Tubing 36 may then be connected in a fluid-tight joint using a compression type connector 42. Pressure switch 34 may be of the usual diaphragm type and can be readily connected or disconnected from the system simply by operating gate valve 38. Pressure switch 34 is installed with normally open contacts. However, upon decrease of fluid pressure in piping 13 below a predetermined amount, the action of switch diaphragm will cause contacts 68, 69 to close and energize indicator light 66 provided at top of dispensing unit 15.

Figure 4:
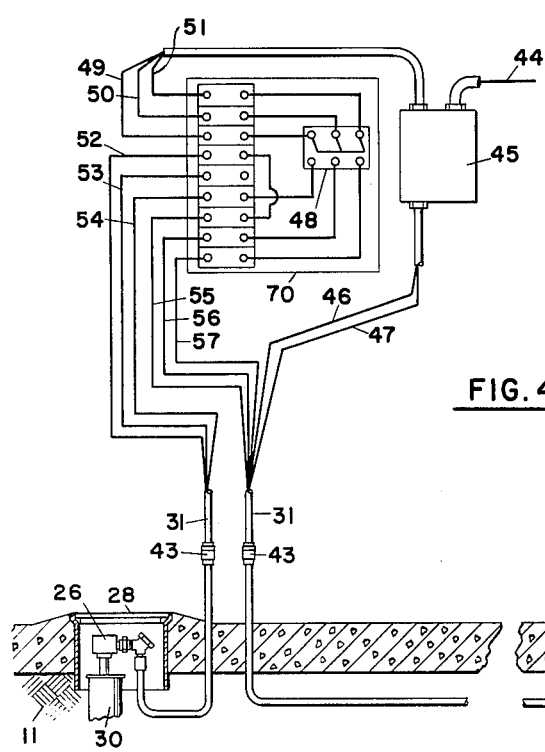
FIG. 4 is a representative wiring diagram showing the instant invention connected into the operating circuit.

A representative wiring diagram of a remote pump installation utilizing my invention is set forth in FIG. 4. As indicated, a single phase, 230 or 208 volt, three wire service 44 feeds service entrance switch and panel board 45. Lighting circuit comprising wires 46, 47 by-passes terminal block 70, runs in conduit 31 through conduit seal 43 underground to terminals 71, 72 in junction box 67. Line wires 49, 50 and neutral conductor 51 connect panelboard 45 with terminal block 70 and permit pump motor control through motor switch 48. Motor wires 52, 53, 54 are pulled through conduit 31 from terminal block 70 to motor junction box 26 located in manhole 28. Motor control and pilot light circuit comprising conductors 55, 56 and neutral conductor 57 may be run in same underground conduit 31 from terminal block 70 to junction box 67 in dispenser 15 as lighting circuit wires 46, 47. Double pole motor switch 62 remotely controls operation of motor and pump assembly 24 while pilot light 61 remotely indicates pump operation. Dome light 60 and dial light 59 controlled by light switch 58 illuminate dispensing unit at night by drawing current from lighting circuit conductors 46, 47 connected at terminals 71, 72 in junction box 67.

Also connected at terminals 71, 72 in junction box 67 located in remote dispenser 15 are leak indicator circuit conductors 63, 64. Leak indicator circuit comprises pressure switch 34 having normally open contacts 68, 69, a flasher 65 and an external indicator light 66 mounted directly on top of dispensing unit. As connected, indicator circuit is wired ready for operation at any time. Should a leak develop in the discharge piping 13, the normal pressure will drop causing pressure switch 34 to close thereby energizing the circuit. Indicator light 66 will alternately flash on and off under the influence of flasher 65 to attract attention. Should a failure occur during the night or at other times when no attendant is on duty, passersby or the police would be alerted by the flashing light and knowledge of the underground leak could rapidly be transmitted to a responsible party. Upon correction of the underground fault, full pressure would be restored to the piping system and the pressure switch would return to the open position, thus de-energizing the indicator light circuit.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

In a gasoline leak detector for use in remote type service station installations, the combination of
   a system of piping connecting a gasoline storage tank and a gasoline dispensing unit,
      said storage tank integrally supporting a submerged pump, and
      said dispensing unit being equipped with a flow control nozzle designed to maintain piping system pressure when not in use,
         said pump maintaining the said piping system under pressure during all periods of normal operation;
   a pressure switch mounted within the said dispensing unit,
      said switch having an open position and a closed position,
      said switch having a pressure sensing element responsive to the said pressure being maintained in the said piping system,
         said pressure sensing element normally maintaining the pressure switch in its said open position, and
         the said sensing element closing the said switch upon a predetermined drop in the piping system pressure;
   a source of electrical current energizing a pair of electrical terminals within the said dispenser,
      said terminals feeding an illumination circuit within the said dispenser, and
      a pressure switch actuated electrical warning circuit connected to the said terminals,
         said circuit including a signalling device and a signal modifying device,
         said circuit being activated by the closing of the said pressure switch when a predetermined drop in pressure is sensed.

References Cited by the Examiner

UNITED STATES PATENTS

| | | |
|---|---|---|
| 2,004,769 | 6/1935 | Shanklin. |
| 2,230,961 | 2/1941 | Lewis _____ 340—242 |
| 2,244,392 | 6/1941 | Emanueli. |
| 3,183,723 | 5/1965 | Deters _____ 73—40.5 |

DAVID SCHONBERG, *Primary Examiner.*

F. H. THOMSON, *Assistant Examiner.*